US006859217B2

(12) United States Patent
Robertson et al.

(10) Patent No.: US 6,859,217 B2
(45) Date of Patent: Feb. 22, 2005

(54) SYSTEM AND METHOD TO DISPLAY AND MANAGE DATA WITHIN HIERARCHIES AND POLYARCHIES OF INFORMATION

(75) Inventors: George G. Robertson, Seattle, WA (US); Kim Cameron, Bellevue, WA (US); Mary P. Czerwinski, Woodinville, WA (US); Daniel C. Robbins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 502 days.

(21) Appl. No.: 09/728,935

(22) Filed: Nov. 29, 2000

(65) Prior Publication Data

US 2002/0030703 A1 Mar. 14, 2002

Related U.S. Application Data

(60) Provisional application No. 60/219,796, filed on Jul. 19, 2000.

(51) Int. Cl.[7] .................................................. G06F 3/00
(52) U.S. Cl. ...................................... 345/853; 345/854
(58) Field of Search ................................. 345/764, 781, 345/788, 835, 841, 853, 854

(56) References Cited

U.S. PATENT DOCUMENTS

| | | | |
|---|---|---|---|
| 5,859,978 A | 1/1999 | Sonderegger et al. | |
| 6,223,145 B1 * | 4/2001 | Hearst | 703/22 |
| 6,285,366 B1 * | 9/2001 | Ng et al. | 345/853 |
| 6,434,564 B2 * | 8/2002 | Ebert | 707/100 |
| 6,463,420 B1 | 10/2002 | Guidice et al. | |
| 6,643,652 B2 | 11/2003 | Helgeson et al. | |
| 6,708,161 B2 | 3/2004 | Tenorio et al. | |
| 2001/0047385 A1 | 11/2001 | Tuatini | |
| 2004/0002982 A1 | 1/2004 | Ersek et al. | |

OTHER PUBLICATIONS

T. Howes et al., "The LDAP URL Format", Network Marketing Group, Request for Comments: 2255, Dec. 1997, pp. 1–10.

M. Wahl et al., "A Summary of the X.500(96) User Schema for use with LDAPv3", Network Marketing Group, Request for Comments: 2256, Dec. 1997, pp. 1–20.

M. Wahl et al., "Lightweight Directory Access Protocol (v3)", Network Marketing Group, Request for Comments: 2251, Dec. 1997, pp. 1–50.

M. Wahl et al., "Lightweight Directory Access Protocol (v3): UTF–8 String Representation of Distinguished Names", Network Marketing Group, Request for Comments: 2253, Dec. 1997, pp. 1–10.

T. Howes, "The String Representation of LDAP Search Filters", Network Working Group, Request for Comments: 2254, Dec. 1997, pp. 1–8.

M. Wahl et al., "Lightweight Directory Access Protocol (v3): Attribute Syntax Definitions", Network Working Group; Request for Comments: 2252, Dec. 1997, pp. 1–32.

"The Directory—Overview of Concepts, Models and Services", Melbourne 1988, pp. 1–47.

"Information Technology—Open Systems Interconnection—The Directory: The Models", ISO/IEC 9594–2, Feb. 14, 1993, pp. 1–165.

Biron et al. "XML Schema Part 2: Datatypes" published on the internet at http://www.w3.org/TR/smischema–2/May 2001 pp. 1–21 (of 181).

* cited by examiner

Primary Examiner—Cao (Kevin) Nguyen
(74) Attorney, Agent, or Firm—Lee & Hayes, PLLC

(57) ABSTRACT

An object having first and second intersecting hierarchies is specified. The object is illustrated with respect to the first hierarchy. The second intersecting hierarchy is presented for selection to illustrate the object with respect to the second intersecting hierarchy. In response to selecting the second intersecting hierarchy, the object is illustrated within the second intersecting hierarchy. To illustrate the object within the second intersecting hierarchy, the procedure visually morphs from the first intersecting hierarchy to the second intersecting hierarchy. This means that a first structure representing the first hierarchy is gradually changed to a second structure that represents the second hierarchy.

18 Claims, 13 Drawing Sheets

SYSTEM AND METHOD TO DISPLAY AND MANAGE DATA WITHIN HIERARCHIES AND POLYARCHIES OF INFORMATION

RELATED APPLICATIONS

This application claims the benefit of U.S. Provisional Application No. 60/219,796, filed Jul. 19, 2000, entitled "Hierarchy Visualization", to George G. Robertson and Kim Cameron.

TECHNICAL FIELD

The description relates generally to a graphical user interface of a programmed computer system. More specifically, the description relates to a system and procedure for displaying and managing data within multiple intersecting hierarchies of data.

BACKGROUND

A variety of application programs and operating systems include a user interface feature enabling users to view a listing of information stored on a computer or one or more data bases connected to the computer. For example, the "Windows"-brand operating system from Microsoft Corporation includes a File Manager program to help a user keep track of files stored in a computer.

A hierarchy, or tree structure, is a set of nodes or elements that are connected to each other with each node except the root node having exactly one parent. The root node has no parent. Each node has any number of children, from none to many. A node with no children is called a leaf node.

One example of this tree structure is a file system where related information is grouped together using a hierarchy of subdirectories. In this example, the main directory is the root node of the tree and any subdirectories to the main directory are its child nodes. Each subdirectory can be broken into a number of other subdirectories to achieve additional layers of the file system hierarchy. At each level of the file system hierarchy, there may be a number of files, which are leaf nodes of the tree structure. In addition to directories of files, the concept of a tree structure can be extended to other arbitrary groupings of data.

While some systems display or manage information in a hierarchical fashion, recent developments in information technology provide network administrators with data that are not able to be displayed using such traditional systems.

For example, network administrators trying to maintain disparate directories of enterprise users and resources are beginning to use metadirectories. A metadirectory ties disparate directories—such as those associated with databases, e-mail applications, human resource systems, network operating system directories, and other corporate systems, into a single, logical directory. The ability to merge databases and information like this is recent. Traditional systems and procedures do not provide means to access, display, and manage the complex relationships between the data provided by a metadirectory. Data about people and resources is just one example of data. Anytime an enterprise merges various databases together, the enterprise will typically encounter multiple intersecting hierarchies of data.

There is a need for an improved user interface that enables a user to view and manage the complex relationships among data presented by metadirectories.

SUMMARY

The system and procedures described below display and manage the complex relationships between data provided by a metadirectory. One described procedure includes specifying an object having first and second intersecting hierarchies. The object is illustrated with respect to the first hierarchy. The second intersecting hierarchy is presented for selection to illustrate the object with respect to the second intersecting hierarchy. In response to selecting the second intersecting hierarchy, the object is illustrated within the second intersecting hierarchy.

To illustrate the object within the second intersecting hierarchy, the procedure visually morphs from the first intersecting hierarchy to the second intersecting hierarchy. When morphing, the first structure representing the first hierarchy is gradually changed to a second structure that represents the second hierarchy.

In one implementation, the morphing process employs a visual pivot in which the first hierarchical structure is changed to a second hierarchical structure by graphically pivoting about an object that is common to both structures. This visual pivot illustrates the relationship of the objects with respect to the first and second intersecting hierarchies.

BRIEF DESCRIPTION OF THE DRAWINGS

In FIG. 3, a particular object is presented within a first hierarchy.

FIG. 5 shows the particular object within a first hierarchy and second hierarchy as the first hierarchy is being morphed to the second hierarchy in a first stage of a visual pivot technique.

FIG. 6 shows the particular object within a first hierarchy and second hierarchy as the first hierarchy is being morphed to the second hierarchy in a second stage of a visual pivot technique.

FIG. 7 shows the particular object within a first hierarchy and second hierarchy as the first hierarchy is being morphed to the second hierarchy in a third stage of a visual pivot technique.

FIG. 8 shows the particular object within a first hierarchy and second hierarchy as the first hierarchy is being morphed to the second hierarchy in a first stage of a visual slide technique.

FIG. 9 shows that the graphical user interface further comprises a search results area to display one or more objects that correspond to the particular object.

FIG. 10 illustrates that upon selection of a different object identifier from the search results area, the selected additional object replaces any details of the particular object with respect to the current hierarchy.

FIG. 11 shows the selection of objects from the search area and display of multiple objects with respect to a hierarchy of information.

FIG. 12 shows a filter selection area to filter the object identifiers displayed in the search area. FIG. 12 also shows context sensitive information corresponding to displayed objects.

DETAILED DESCRIPTION

The following description provides a system and procedure to display and manage data objects within complex hierarchies and polyarchies of data. In a hierarchy, data is arranged in a graded series with respect to other data. A data polyarchy is two or more intersecting hierarchies of data. In other words, in a data polyarchy one or more data nodes in a first hierarchy are shared in various dimensions with one or more other hierarchies of data.

To illustrate a polyarchy, or multiple intersecting hierarchies of information, consider the following example. In a company, a person has both implicit and explicit relationships not only to other people, but also to company resources, geographical locations, business units, club memberships, hobbies, and the like. Each of these relationships respectively represents a hierarchy of data, or information. Thus, one hierarchy might show an individual within an organizational chart of people and another hierarchy might depict the individual's physical location on the company campus. A polyarchy is formed from the multiple hierarchies because each hierarchy shares a common node along various dimensions that corresponds to the person.

Polyarchies, or multiple intersecting hierarchies of information, become very complex when they exist with respect to multiple people and/or multiple resources. To illustrate this, consider that one or more of the above listed hierarchies may intersect with other respective hierarchies of information that correspond to other people who work for the same company, live in the same geographical area, belong to the same clubs, share supervisors, computing resources, titles, building locations, e-mail lists membership, and the like. Unfortunately, traditional systems and procedures do not provide means to display and manage the complex relationships between such data.

Exemplary System

Figure 1:
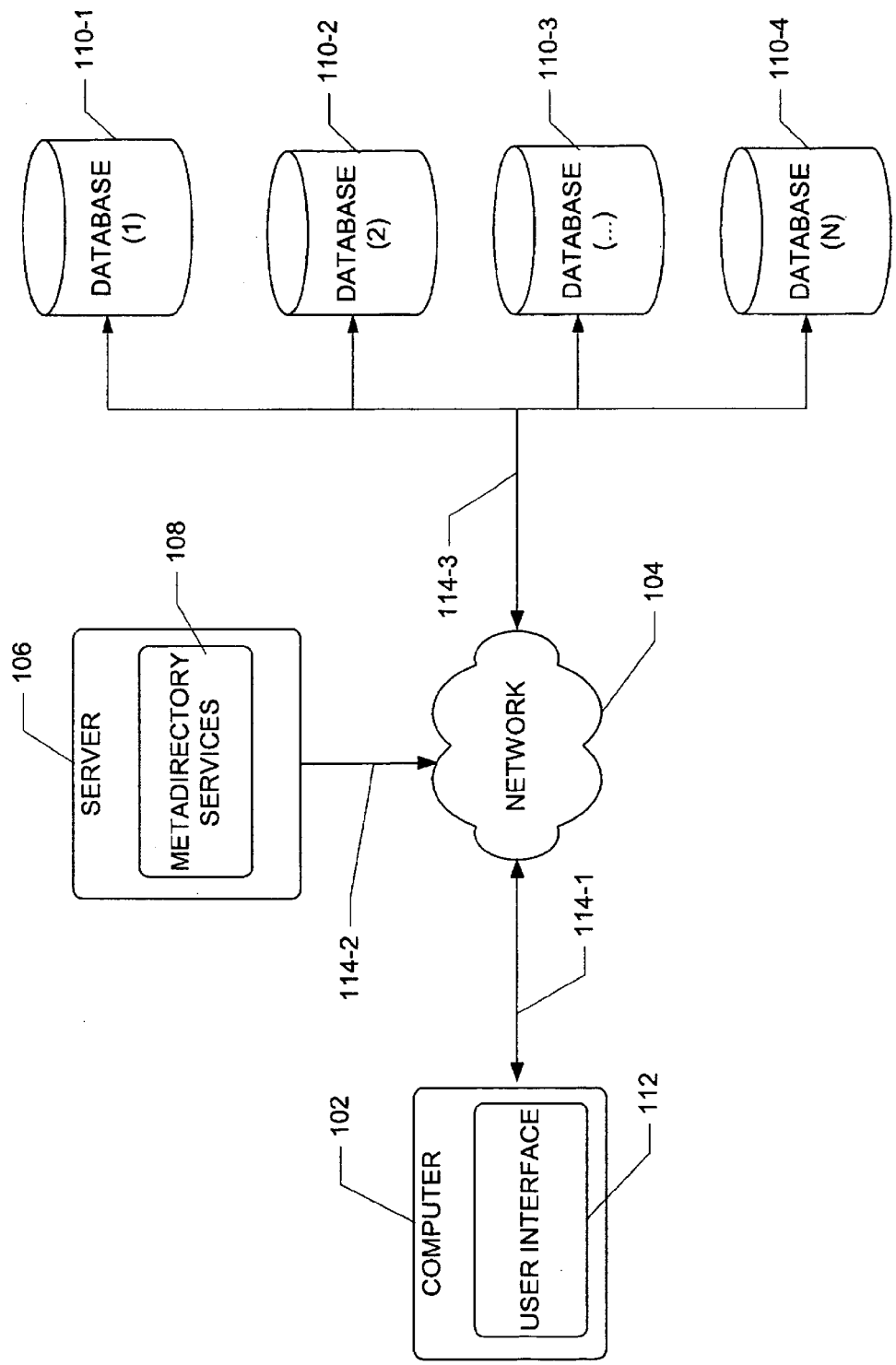
FIG. 1 is a block diagram of a system for displaying and managing objects within multiple hierarchies of information.

FIG. 1 is a block diagram of a system 100 to display and manage data within multiple intersecting hierarchies of information. The system includes a computer 102 that is logically connected across communication pathways 114 to metadirectory services server 106, which in turn is logically connected to one or more databases 110. The logical connections in system 100 can be a local area network (LAN) and a wide area network (WAN). Such networking environments are commonplace in offices, enterprise wide computer networks, intranets, and the Internet.

Databases 110 are object-oriented databases, wherein objects are linked to other objects. For example, Extensible Markup Language (XML) databases and Hypertext databases are examples of well known databases where objects are linked to other objects. The databases represent disparate sources of information—such as information associated with e-mail applications, human resource systems, network operating system directories, other corporate systems, and the like. Databases 110 include can include, for example, SQL server databases.

Metadirectory services server 106 includes a processor (not shown) and operating system (not shown) used to execute a metadirectory services application 108. The metadirectory services application ties the disparate directories of information provided by databases 110 into a single, logical directory. Server 106 serves data from databases 110 to computer 102 in response to queries.

Computer 102 includes a processor (not shown) and an operating system (not shown) that support a graphical user interface 110. Graphical user interface 110 displays data served from metadirectory services server 106 within hierarchies and polyarchies of information.

Exemplary Computer

Figure 2:
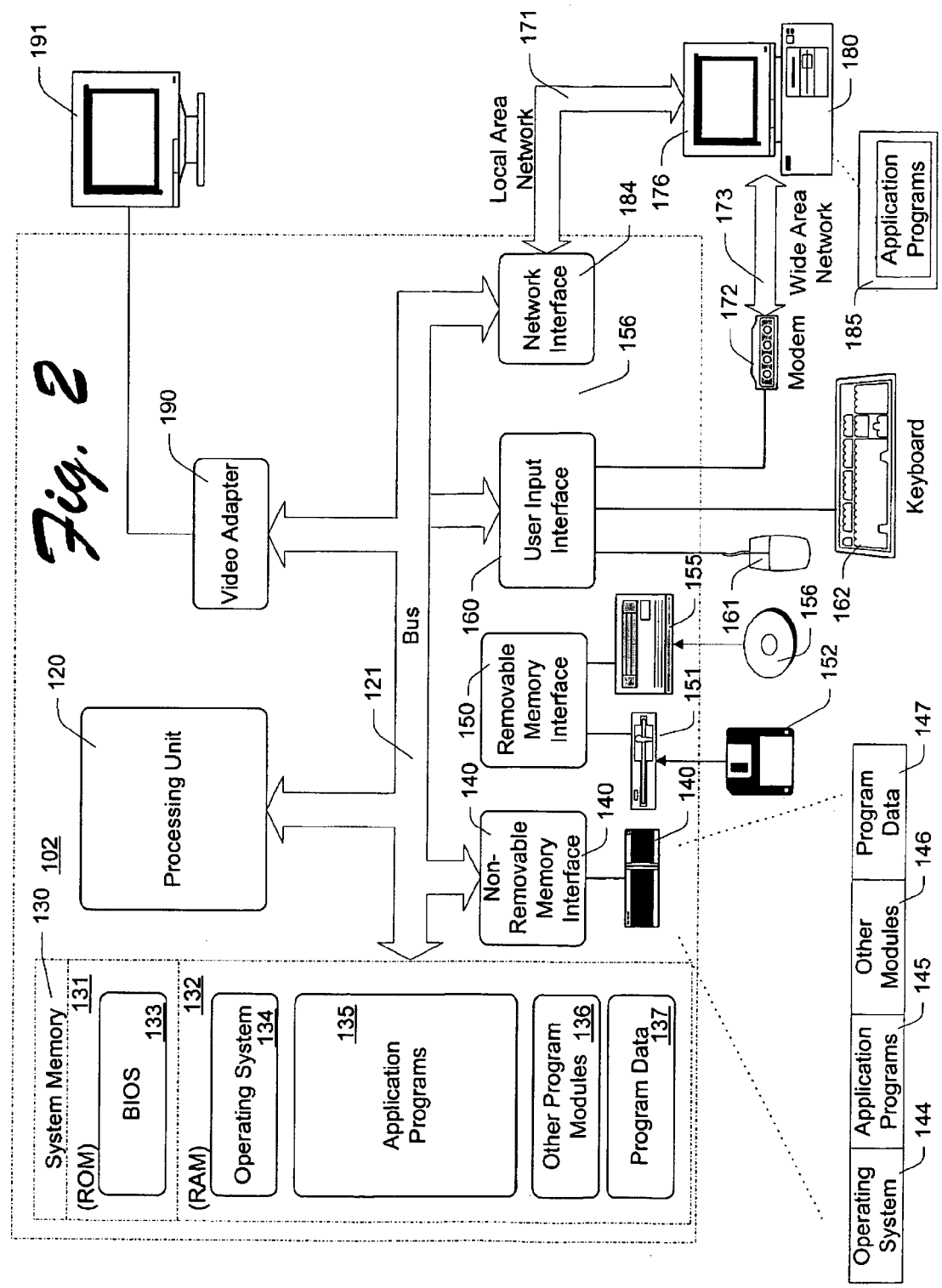
FIG. 2 is a block diagram of a computer for displaying and managing objects within multiple hierarchies of information.

FIG. 2. shows a computer 102 that forms a suitable environment for the system described above. The components shown in FIG. 2 are only examples, and are not intended to suggest any limitation as to the scope of the functionality of the invention; the invention is not necessarily dependent on the features shown in FIG. 2.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 2, the components of computer 102 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 102 typically includes a variety of computer-readable media. Computer-readable media can be any available media that can be accessed by computer 102 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 102, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137. As is well known, operating systems provide such low-level functions as module (process and dynamic link library) management, scheduling, interprocess messaging, memory management, file system management, and graphical user interface support.

The computer 102 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface such as interface 150.

The drives and their associated computer storage media discussed above and illustrated in FIG. 2 provide storage of computer-readable instructions, data structures, program modules, and other data for computer 102. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 102 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190.

The computer may operate in a networked environment using logical connections to one or more remote computers, such as a remote computer 180. The remote computer 180 may be a personal computer, a server, a router, a network PC, a peer device or other common network node, and typically includes many or all of the elements described above relative to computer 102, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 102 is connected to the LAN 171 through a network interface or adapter 170. When used in a WAN networking environment, the computer 102 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 102, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Graphical User Interface

Figure 3:
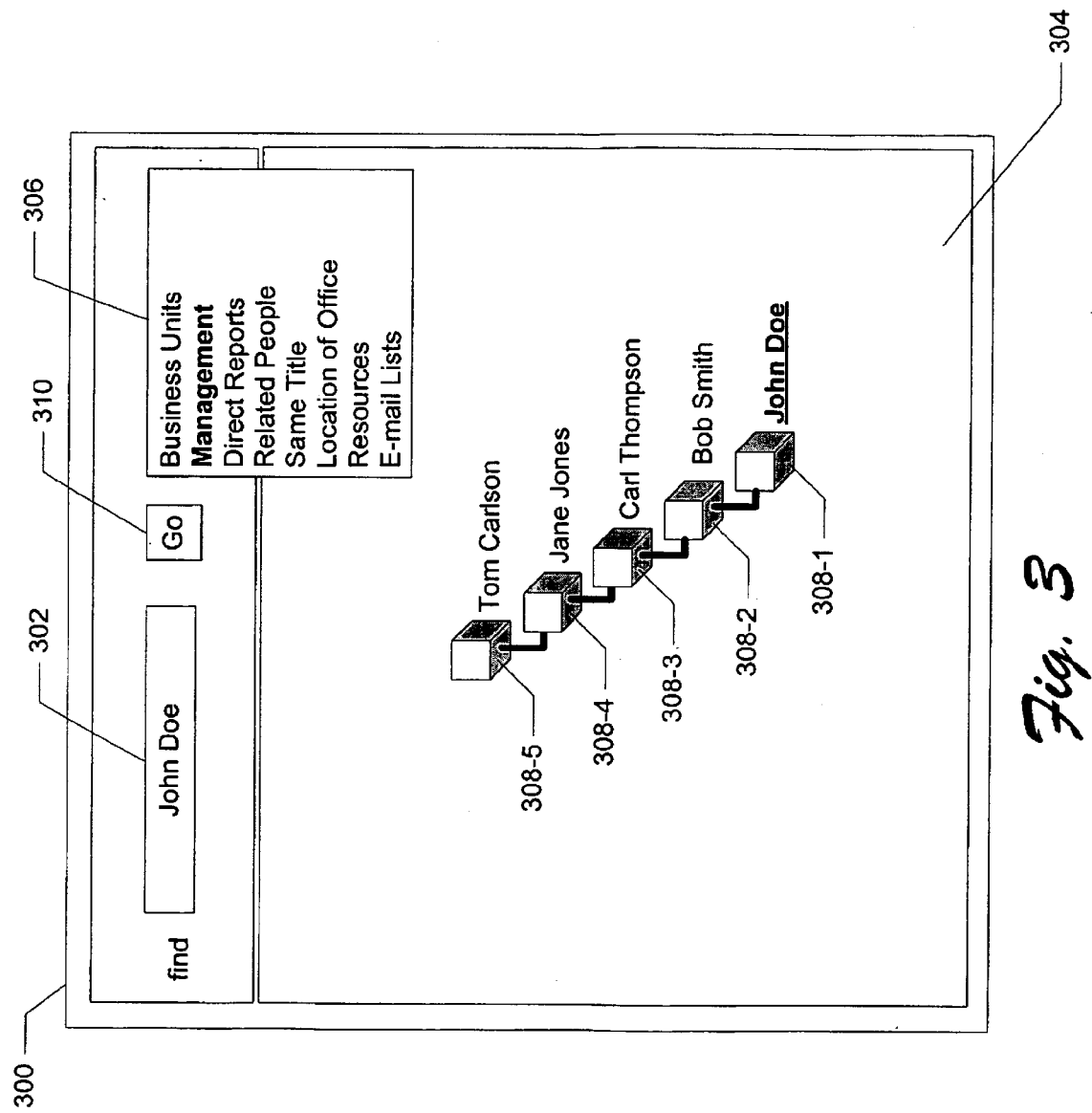
FIG. 3 illustrates a graphical user interface that is capable of presenting multiple objects within multiple different hierarchies of information.

FIG. 3 illustrates a graphical window 300 for displaying and managing objects within multiple hierarchies. An object entry area 302 facilitates user specification of an object that may be part of one or more hierarchies. In this illustration, the object entry area is implemented as a text entry area that allows a user to type in a desired object, such as an object to a person named "John Doe".

A hierarchy display area 304 is used to illustrate the specified object with respect to a selected hierarchy once the user enters a specific object. Here, the depicted hierarchy is a management organizational chart in which John Doe is a member. Hierarchy display area 304 shows nodes 308 with various members in the "Management" hierarchy, including John Doe.

A hierarchy selection area 306 allows a user to select another hierarchy within which the object may be presented. Here, the hierarchy selection area 306 is a drop down menu that illustrates different hierarchies that apply to John Doe, thereby facilitating user selection of a second hierarchy within which to display the specified object, John Doe. In this example, the different hierarchies that apply to John Doe include, management, business units, direct reports, related people, same title, location of office, resources, and e-mail lists. These different hierarchies could be any other type of hierarchy. A system administrator could specify the hierarchies that correspond to objects. Upon selection of another hierarchy from hierarchy selection area 306, the hierarchy display area 304 is changed to illustrate the object with respect to the second intersecting hierarchy.

We now describe a procedure used to display the specified object into window 300. First, a user must specify an object into the object specification control 302. Then, the user selects a "Go" control 310, whereupon the computer queries one or more databases to determine a list of hierarchies that correspond to the specified object. The data store returns the query results, which include indications of the different hierarchies defined for the specified object.

In the described embodiment, the Extensible Markup Language (XML) is used to format the search query and the search query results between the computer and the data store. XML is a well known document markup language. An example of an XML search query to a data store to determine a list of hierarchies that correspond to the name "John Doe" is illustrated in Table 1.

TABLE 1

Example of an XML Object Hierarchy Node Search Query

Search http://ggr1:81/Post:Query/?Query=<NodeSearch><SearchFor>
John Doe</SearchFor><SearchAttribute>any</SearchAttribute>
<ElementsOfInterest><Element>cn</Element><Element>uid<
/Element>><Element>roomNumber</Element>><Element>
telephoneNumber</Element></ElementsofInterest></NodeSearch>

The XML search query illustrates that a node search is being made with respect to John Doe. In this implementation, the result of the node search query is a list of all of the "John Doe's" in the company. Additionally, certain optional elements of interest are included in the query. Such optional elements include user id ("uid"), room number, telephone number, and a common name ("cn"). Table 3 provides an example or a node query, which in this implementation results in returning a hierarchy for "John Doe".

TABLE 2

Example of a Selected Hierarchy Node Query

Search http://ggr1:81/Post:Query/?Query=<NodeQuery><UserID>John
Doe</UserID><dimension+up="*">Management</dimension>
<ElementsOfInterest><Element>cn</Element><Element>uid<
/Element><Element>title</Element><Element>telephoneNumber<
/Element> <Element> buildingName </Element><Element> roomNumber
</Element> </ElementsofInterest> </NodeSearch>

This query indicates that the specified user ("UserID") is John Doe, and also indicates that the nodes of interest are in the Management hierarchy ("dimension"). More particularly, the query asks for all of those nodes that are parent nodes to John Doe within the Management hierarchy ("dimension+up='*'"). Optional elements of interest for each identified node are also requested. The values of these optional elements can be used to provide a user with additional information.

Table 3 provides an example of the selected hierarchy node query result.

TABLE 3

Example of a Selected Hierarchy Node Query Result

<Query Results> <Person ID = "19433-4945" Dimension =
"Management"> <cn>Tom Carlson </cn> <uid>TOMC </uid>
<TelephoneNumber> +1800555-1212</TelephoneNumber> <Title>
Chairman </Title> <RoomNumber> 2110 </RoomNumber> <Person
ID = "19999-4955" Dimension = "Management"><cn>Jane Jones<
/cn> <uid>JANEJ</uid> <TelephoneNumber>+1888555-1212
</TelephoneNumber> <Title> Director European Sales</Title>
<RoomNumber>55</RoomNumber> <Person ID = "200009-4005"
Dimension = "Management"> <cn>Carl Thompson</cn> <uid>
CARLT </uid><TelephoneNumber> +1900555-1212 <
/TelephoneNumber><Title> Director U.S. Sales</Title>
<RoomNumber>121</RoomNumber> ><Person ID = "33222"
Dimension = "Management"> <cn>Bob Smith </cn> <uid> BOBS
</uid><TelephoneNumber> +1555555-1212 </TelephoneNumber><Title>
Product Development </Title> <RoomNumber>634</RoomNumber>
<Person ID = "77755-66423" Dimension = "Management">
<cn>John Doe</cn> <uid> JDOE </uid> <TelephoneNumber>
+1777555-1212 </TelephoneNumber> <Title> Sales and Marketing
</Title> <RoomNumber>21</RoomNumber>

Objects corresponding to the selected hierarchy ("management") are returned with the query results. Hierarchy display area 304 shows John Doe within a Management Hierarchy.

In this example, as illustrated in FIG. 3, node 308-1 illustrates the specified object—John Doe. Node 308-1 has a parent node 308-2 that illustrates that John Doe's manager, or supervisor is Bob Smith. (For nomenclature purposes, a node having a parent node is called a child node). Similarly, node 308-3 illustrates that Bob Smith's supervisor is Carl Thompson. Node 308-4 illustrates that Carl Thompson's supervisor is Jane Jones. And, node 308-4 illustrates that Jane Jones' supervisor is Tom Carlson.

Although this example, illustrates the specified object within the Management hierarchy using a tree structure of interconnected parent and child nodes, a specified object can be represented within a hierarchy using different graphical objects or even text. For example, a specified object can be illustrated within a hierarchy using an enumerated list. Moreover, although the nodes are represented as three-dimensional structures, two-dimensional structures can also be used.

Figure 4:
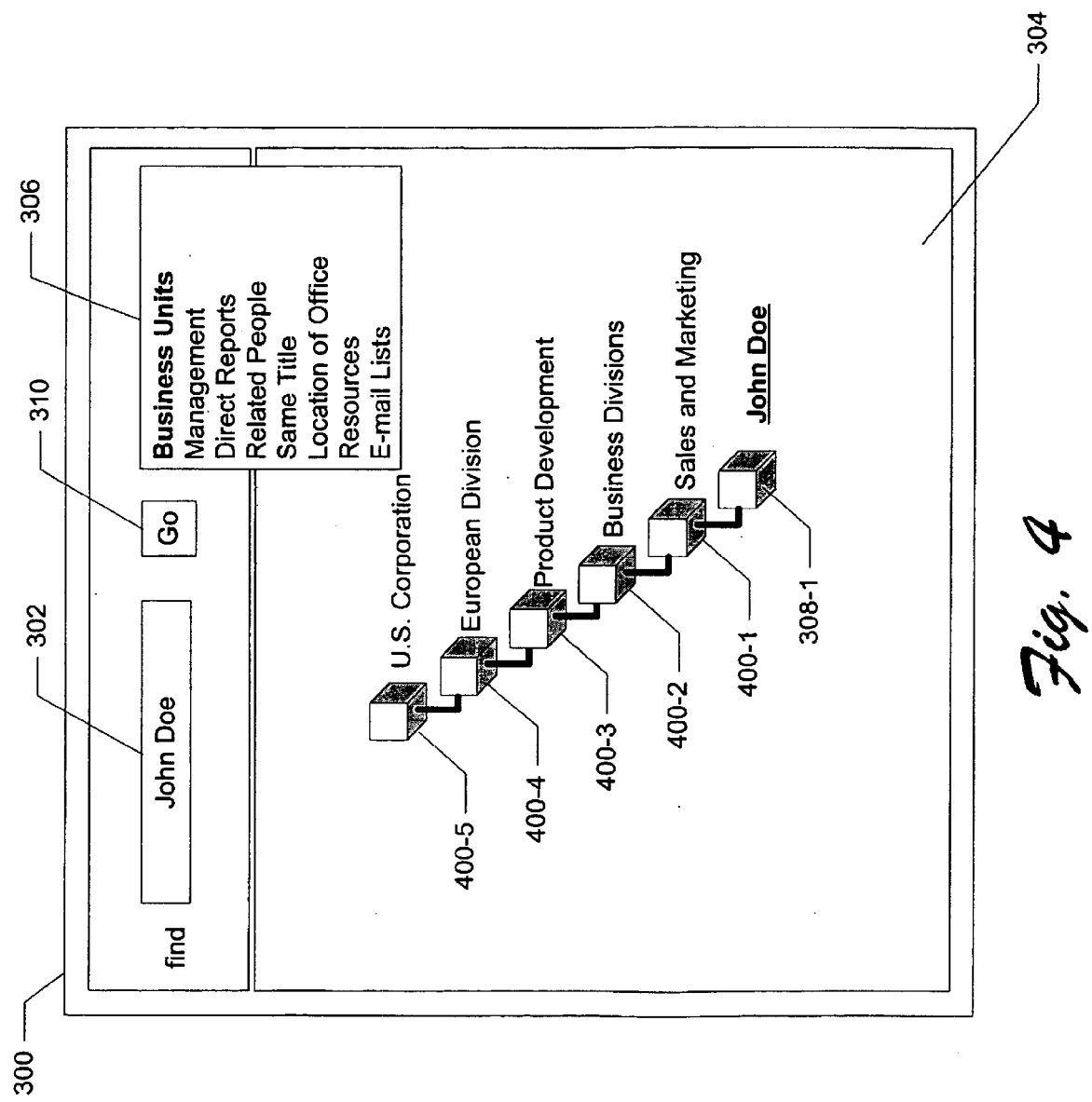
FIG. 4 illustrates the graphical user interface of FIG. 3, but shows the particular object within a second hierarchy.

FIG. 4 illustrates the graphical user interface 300 of FIG. 3, but shows the particular object within a second hierarchy. In this case, the user selects the "Business Units" hierarchy from the hierarchy selection area 306, and the object "John Doe" is now dynamically represented within a business units hierarchy.

For example, recall that FIG. 3 illustrated the specified object, "John Doe" 308-1 with respect to a Management hierarchy. Upon user selection of Business Units hierarchy, as illustrated in hierarchy selection area 306, the graphical user interface 300 displays the specified object of John Doe within the Business Units hierarchy. Any of the other hierarchies listed in hierarchy selection area 306 could also be selected, whereupon the specified object would be illustrated within the selected hierarchy.

The relationship of John Doe within the business unit hierarchy is illustrated as follows: John Doe 308-1 works directly underneath the sales and marketing business unit 400-1. The sales and marketing business unit is part of business divisions 400-2, which in turn is part of product development 400-3. Product development is part of the European division business unit 400-4, which in turn is part of the U.S. corporation business unit 400-5. In this manner, a user can select a second hierarchy within which to view a specified object.

Morphine Between Hierarchies

A structure that illustrates an object within a first hierarchy can be gradually replaced with a different structure that shows the object within a second hierarchy. Such gradual replacement is called visual morphing. Morphing from one hierarchy to another hierarchy provides visual cues to a user that a transition is being made from viewing an object within a first hierarchy to viewing the object within a second hierarchy. One technique to morph between first and second hierarchies is a visual pivot technique.

Figure 5:
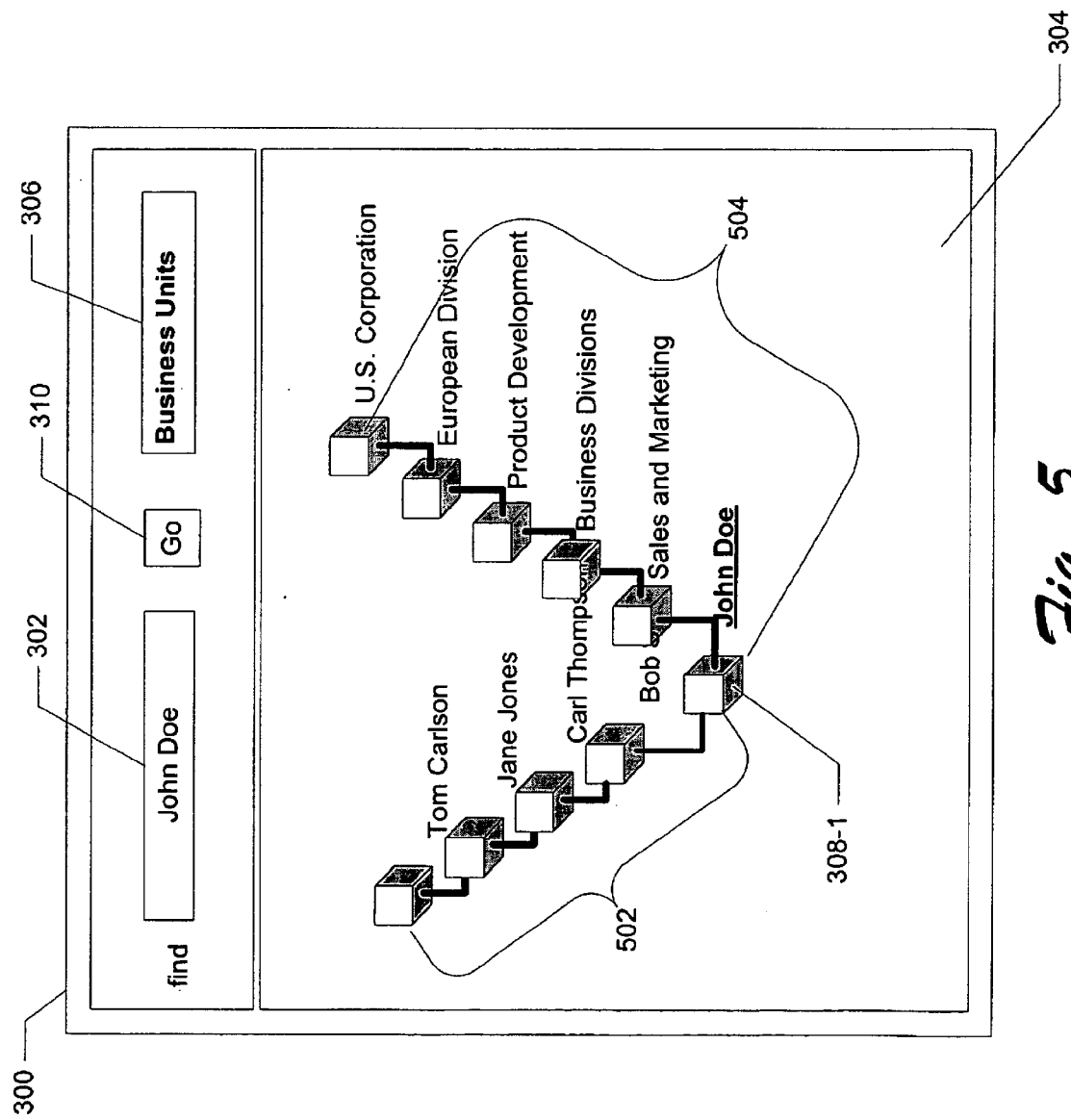
FIG. 5 illustrates the graphical user interface of FIG. 3.
Figure 6:
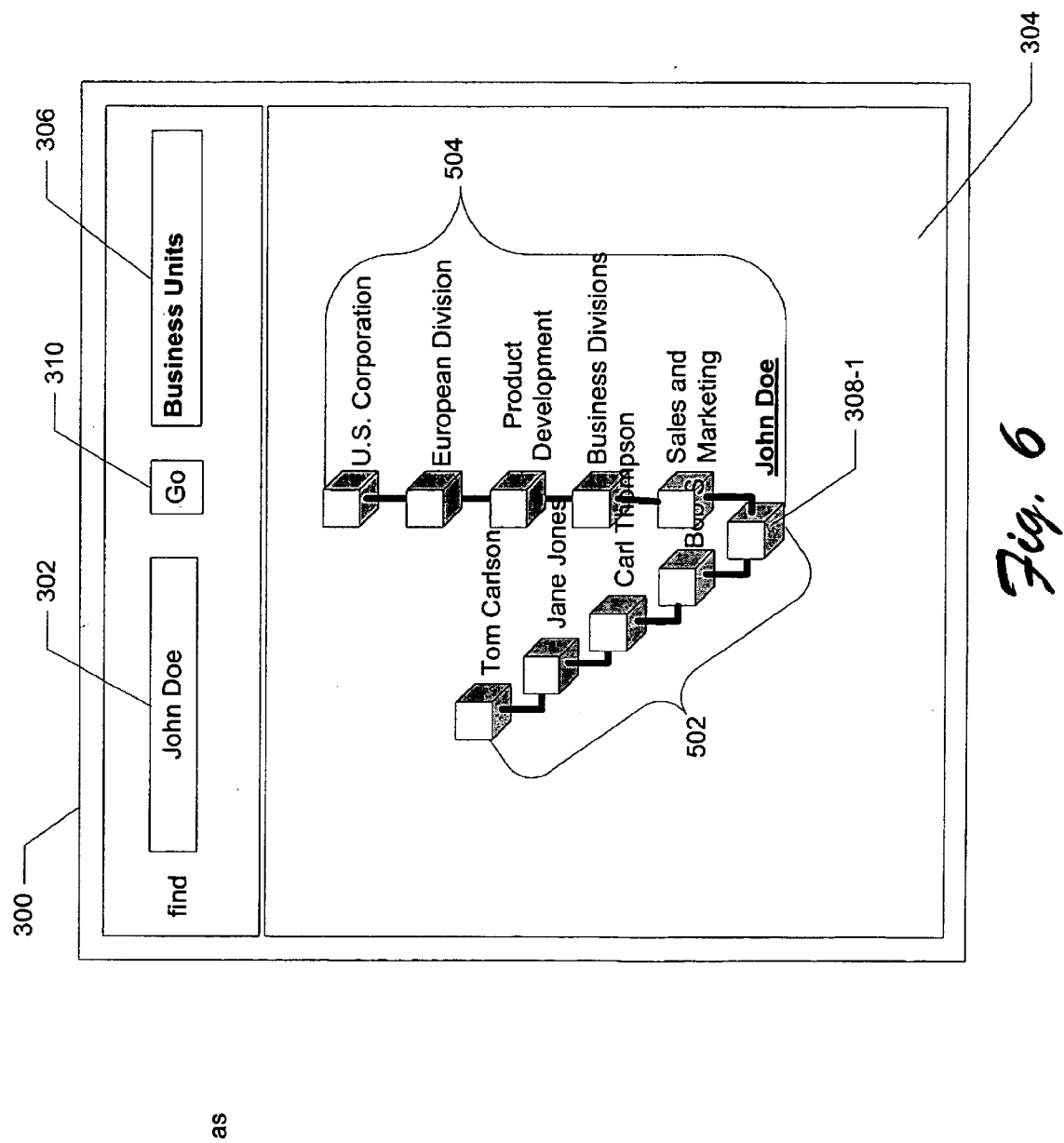
FIG. 6 illustrates the graphical user interface of FIG. 3.
Figure 7:
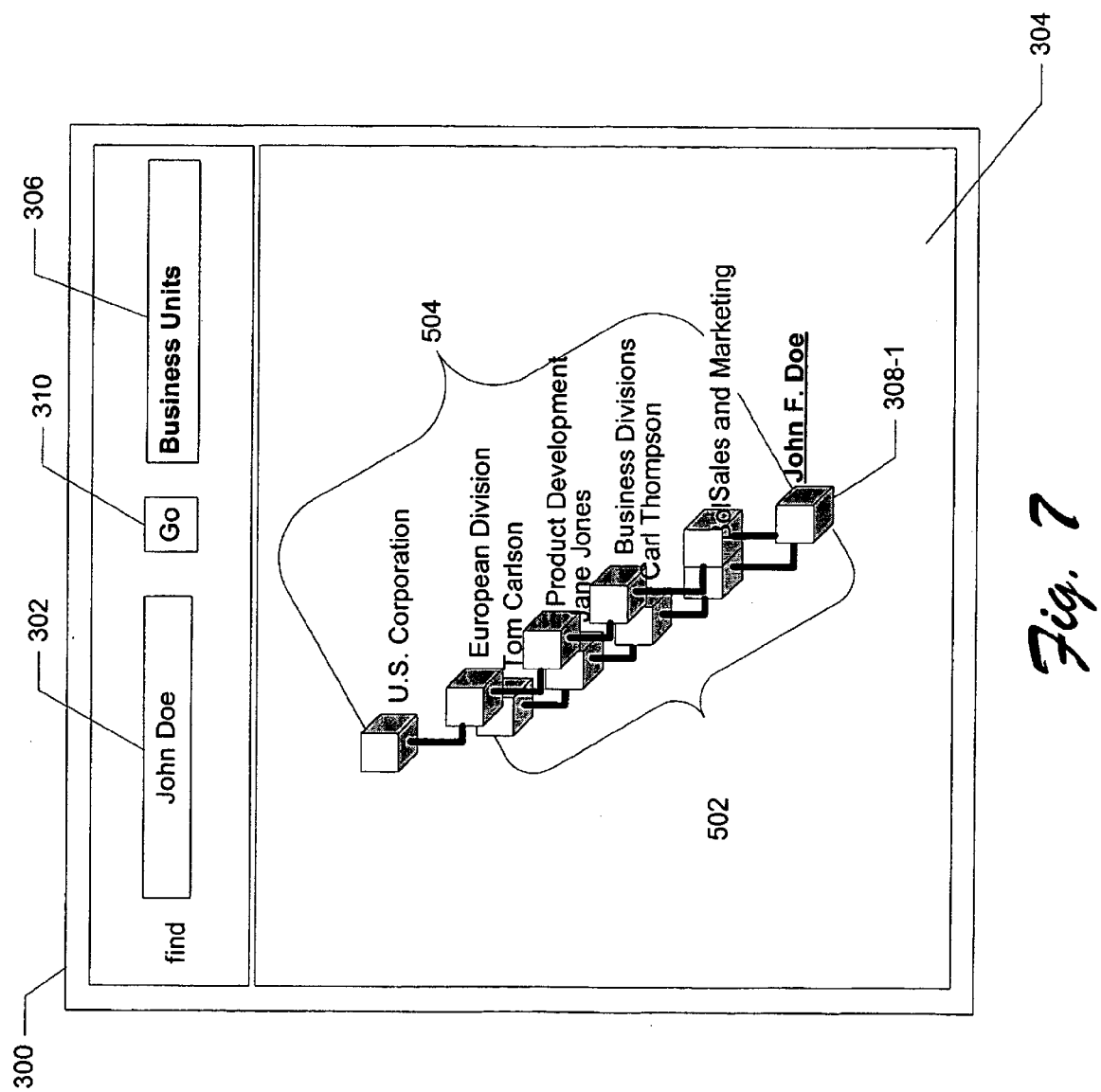
FIG. 7 illustrates the graphical user interface of FIG. 3.

FIGS. 5–7 illustrate a visual pivot technique, wherein a first hierarchical structure is gradually replaced with a second hierarchical structure. FIG. 5 illustrates the hierarchy display area 304 as it would appear immediately after a user selects to view a specified object, in this example, John Doe within a second hierarchy of business units. John Doe is represented within the business unit hierarchy by structure 504. The specified object, John Doe was already represented within the management hierarchy by structure 502. (See also, FIG. 3). Node 308-1 is a common pivot point between structures 502 and 504.

FIG. 6 illustrates the graphical user interface 300 rotating the business unit structure 504 around the common pivot point 308-1 toward the management structure 502. FIG. 7 further illustrates the graphical user interface 300 rotating the business unit structure 504 around pivot point 308-1 closer yet to the management structure 502. This rotational pivot will continue until structure 504 is rotated onto the structure 502, whereupon the structure 502 will be faded out.

FIG. 4 represents the fully rotated business unit structure 504, the structure having been rotated onto the management structure 502. The management structure 502 has been faded out, leaving only the business unit structure 504. In this manner, the second structure was visually pivoted around a pivot point that was common to both structures, and the first hierarchical structure was replaced by the second hierarchical structure.

The visual pivot technique can be modified. Consider that the above example illustrated a pivot about a vertical axis through the selected node with the original hierarchy remaining in place as the second hierarchy was pivoted onto it—appearing somewhat like a book turning a page. The visual pivot, however, could also be performed by moving both hierarchies about the axis until the second hierarchy is in the previous position of the original hierarchy, whereupon the original hierarchy is faded away.

The visual pivot could be performed with one hierarchy being offset vertically to one-another, after the pivot being complete, the second hierarchy being shifted to remove the offset onto the original hierarchy, whereupon the original hierarchy is faded away. Different axis as well as different pivot speeds can be used. Moreover, there are other procedures, including other morphing procedures that can be used to gradually replace a structure that represents an object within a first hierarchy with a different structure that shows the object within a second hierarchy.

Figure 8:
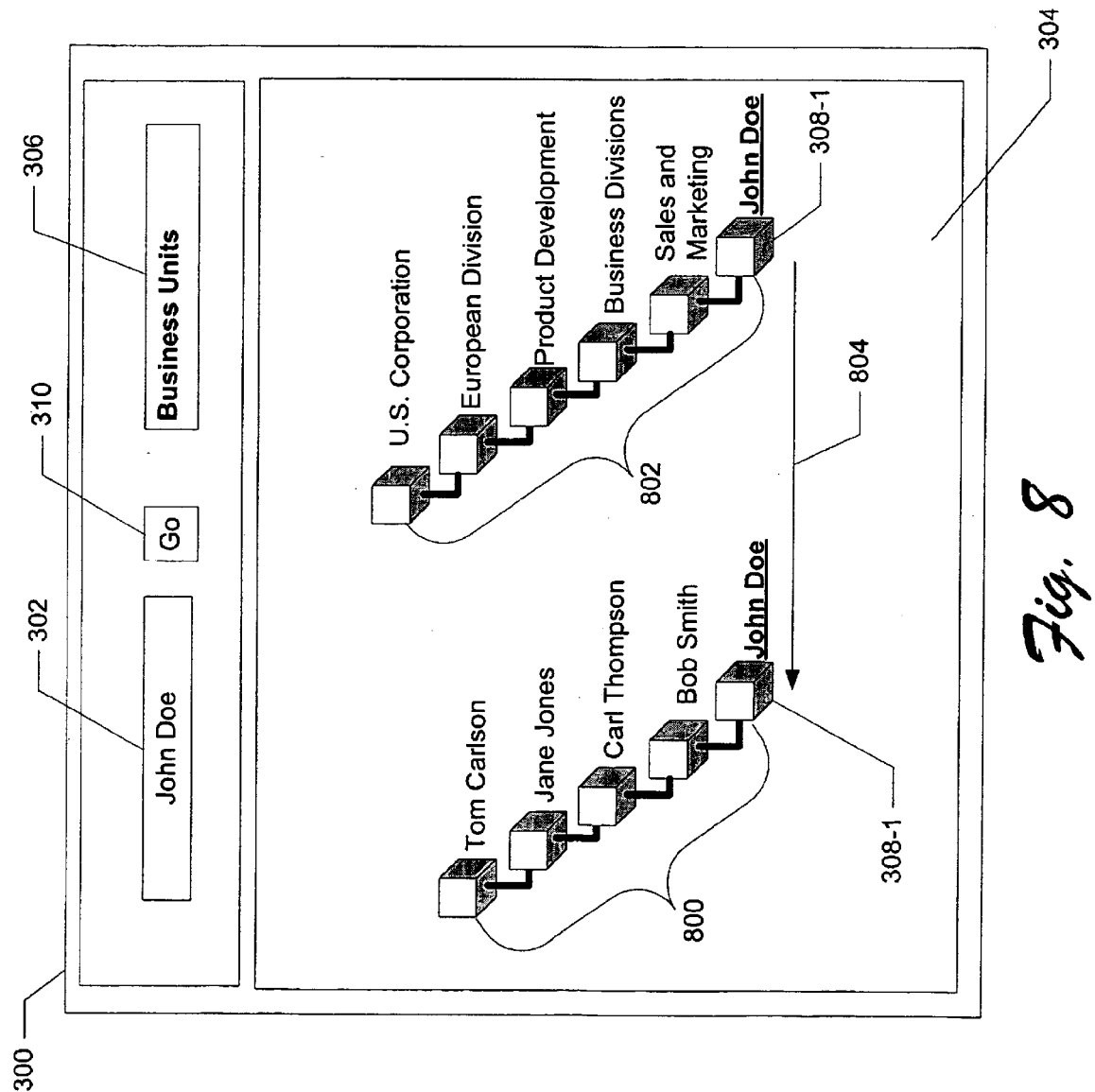
FIG. 8 illustrates the graphical user interface of FIG. 3.

FIG. 8, for example, illustrates another visual morphing technique, a visual slide technique, wherein a first hierarchical structure is gradually replaced with a second hierarchical structure. Hierarchy display area 304 appears as it would immediately after a user selects to view the specified object, in this example, John Doe within a second hierarchy of business units. John Doe was already represented within the management hierarchy by structure 800. (See also, FIG. 3). John Doe within the business unit hierarchy is represented by structure 802. Notice that node 308-1, which represents the specified object of John Doe, appears in both structures.

To gradually replace structure 800 with structure 802, structure 802 is moved laterally until it overlies structure 800. This lateral movement is denoted by directional arrow 804. At this point, structure 800 is faded out, leaving only structure 802. FIG. 4 represents the final result of structure 802 having been laterally moved onto structure 800, whereupon structure 800 was faded out, leaving only structure 802. In this manner, a first hierarchical structure is gradually replaced with a second hierarchical structure.

In another example (not illustrated with a figure), the particular object is shown within each hierarchy of objects on an index card-like user interface control (hereinafter "control"). To switch from one hierarchy to another, the user drags an object from a hierarchy to a rolodex-like control, whereupon the dragged object is illustrated within multiple other hierarchies on superimposed, or laterally positioned index card-like controls. The user then selects the index card-like control that shows the dragged object within the particular hierarchy of interest, whereupon the selected index card-like control is enlarged to illustrate the particular object within the selected hierarchy. In this manner, a first hierarchical structure is gradually replaced with a second hierarchical structure.

In another example (not illustrated with a figure), a card-like structure that illustrates a particular object within a second hierarchy is unfolded onto an illustration of the particular object within a first hierarchy. To accomplish this, the card like structure is first shown superimposed on the particular object within the first hierarchy—the superimposed card is folded and partially open, such that at least a portion of the second hierarchy is shown at the same time that the first hierarchy is visible. The card is folded at an axis defined by the particular object.

To morph the second hierarchy onto the first hierarchy, the card illustrating the particular object within the second hierarchy is gradually unfolded onto the first hierarchy until the card is completely open—whereupon the illustration of the first hierarchy is completely faded away. In this manner, a first hierarchical structure is gradually replaced with a second hierarchical structure. Thus, different techniques can be used to replace an illustration showing a particular object within a first hierarchy with another illustration showing the particular object within a second hierarchy.

Displaying Multiple Specified Objects within a Hierarchy

Figure 9:
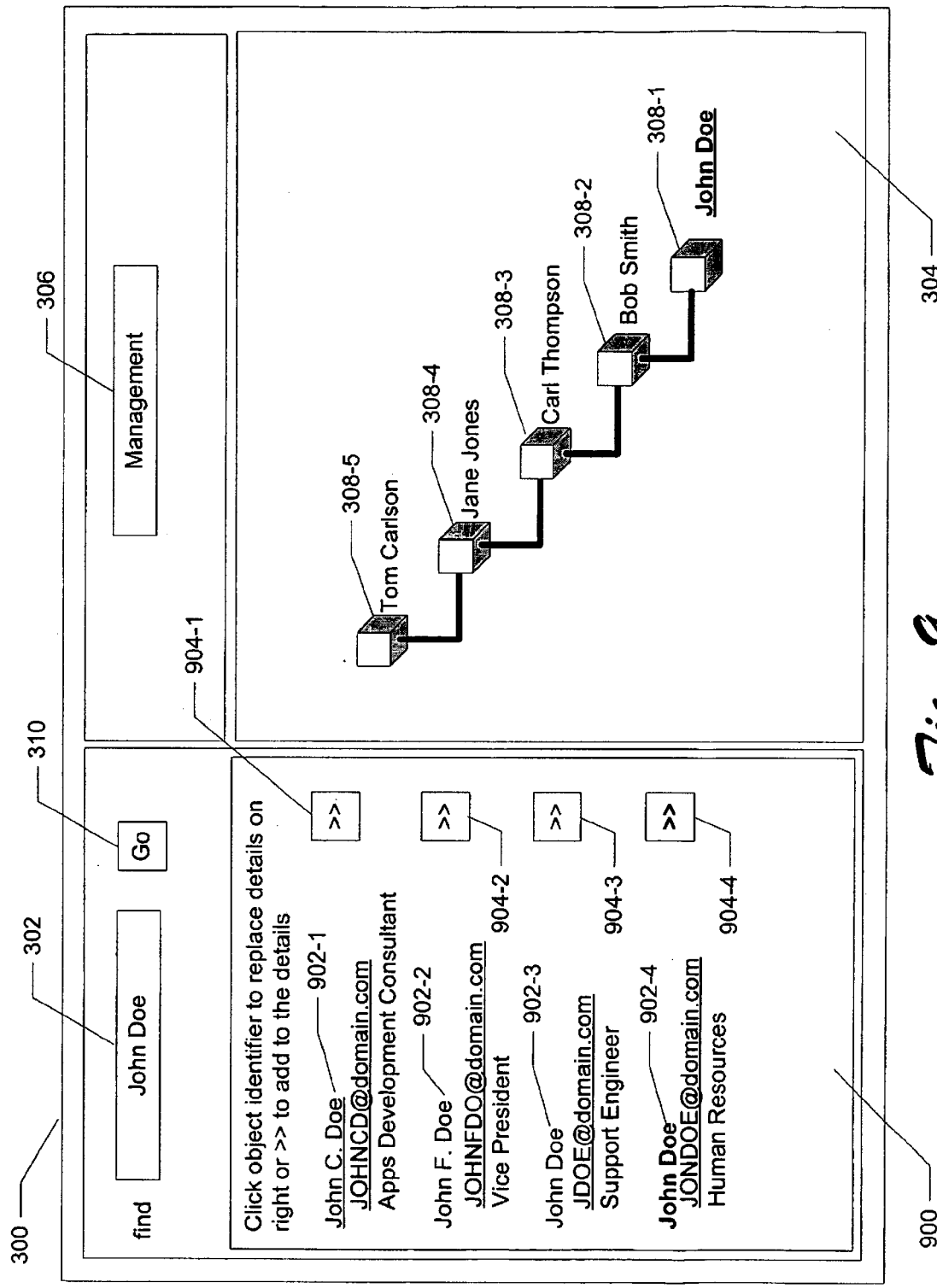
FIG. 9 illustrates the graphical user interface of FIG. 3.

FIG. 9 illustrates a graphical user interface for displaying and managing data within multiple intersecting hierarchies of information. In particular, FIG. 9 illustrates the that graphical user interface 300 further comprises a search results area 900 to display one or more objects that correspond to a search for an object specified in the object entry area 302. Here, a user is looking for "John Doe", and the search identifies several different John Does.

Search results area 900 also facilitates user selection of an additional object 902. Upon selection of an object identifier 902 of an additional object 902, the additional object replaces any details in hierarchy display area 304 and displays the additional object within the current hierarchy.

Upon user selection of a ">>" control 904, a corresponding additional object is added to the details displayed in hierarchy display area 304, such that the additional object is displayed with other specified objects in the current hierarchy. The object identified 902-4 is highlighted to illustrate that "John Doe" is illustrated within the current hierarchy.

Figure 10:
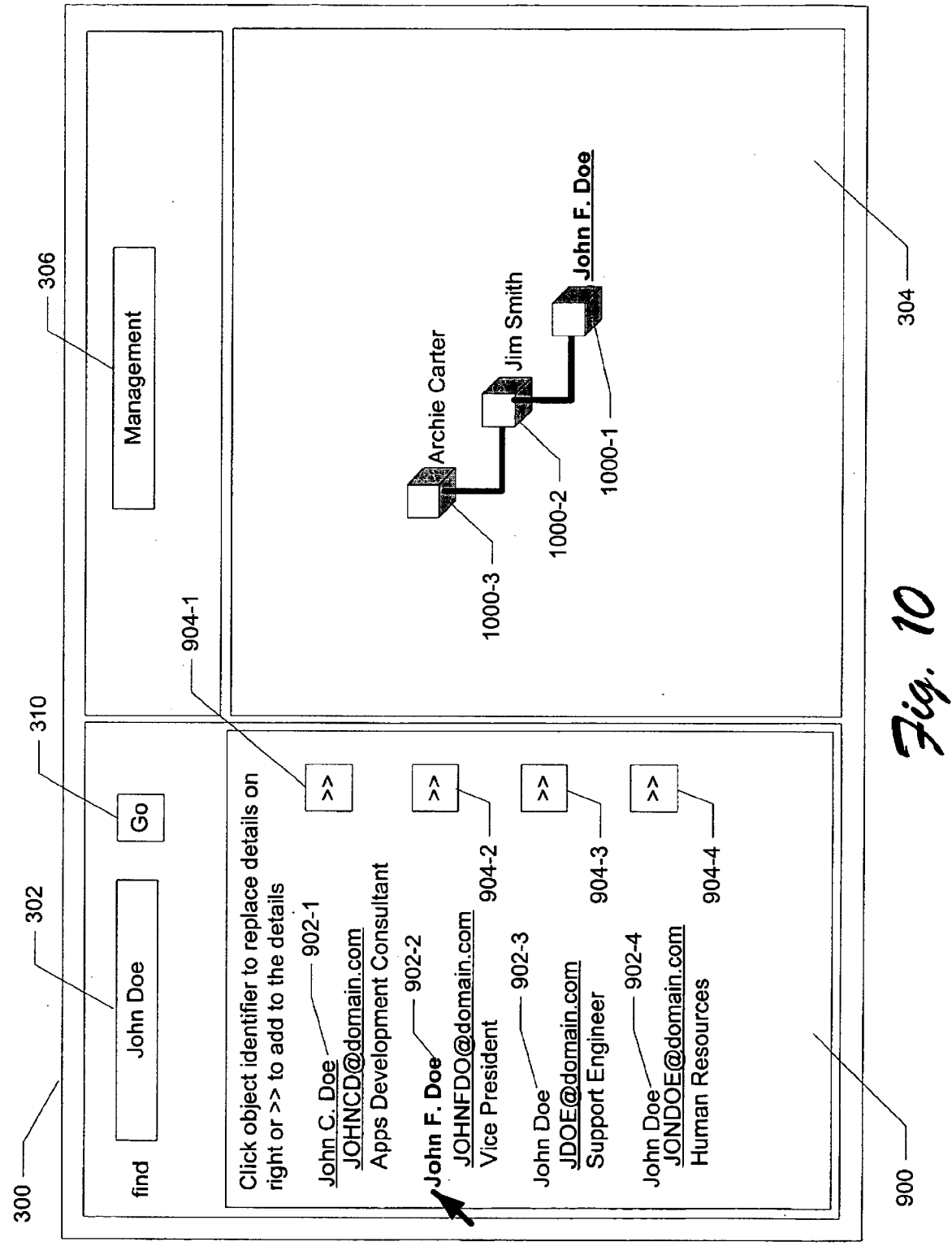
FIG. 10 illustrates the graphical user interface of FIG. 9.

FIG. 10 illustrates that upon selection of a different object identifier 902 of (this is indicated by the selection arrow and the bolded font), the selected additional object replaces any details in hierarchy display area 304, whereupon the selected additional object is displayed within the current hierarchy. Notice that nodes 308, representing John Doe 902-4 within the management hierarchy (see FIG. 9) were replaced with nodes 1000, representing John F. Doe within the management hierarchy.

Figure 11:
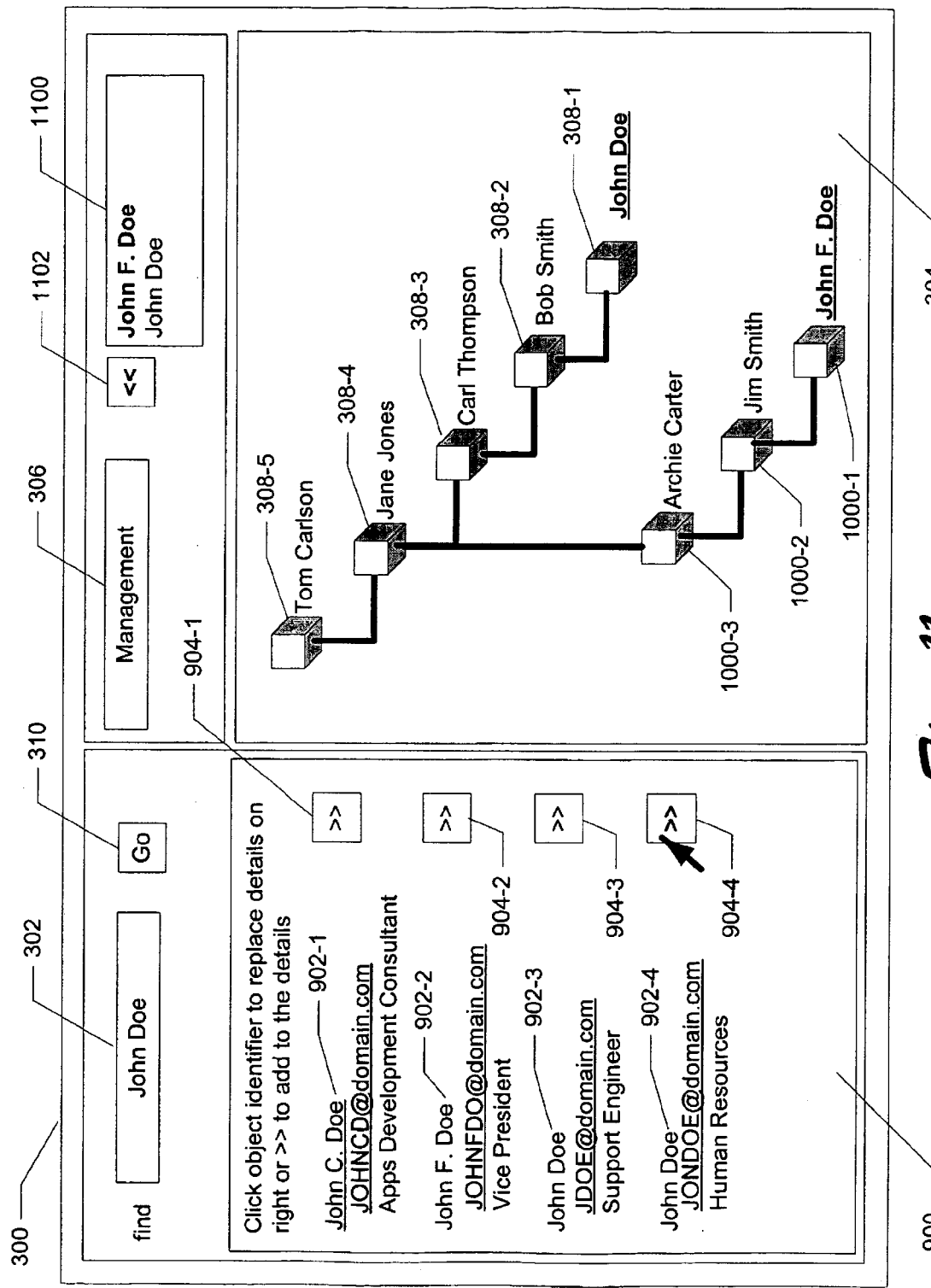
FIG. 11 illustrates the graphical user interface of FIG. 9.

FIG. 11 illustrates specification and display of multiple objects with respect to a hierarchy. Upon user selection of a ">>" control 904, the control's corresponding object 902 is also displayed within the current hierarchy without replacing any other details in hierarchy display area 304.

For example, upon selection of control 904-4 corresponding to John Doe 902-4, both John Doe and John F. Doe are displayed within the current hierarchy of information, the management hierarchy. John Doe is represented within the management hierarchy with nodes 308. John F. Doe is represented within the management hierarchy with nodes 1000. This example, further illustrates that John Doe and John F. Doe share a management entity, represented by node 308-4 Jane Jones. In this manner, complex relationships between objects can be visualized within a hierarchy of information.

In this implementation, if a new portion of the display would replace part of the current display, as opposed to simply adding it, the part of the display being replaced is moved by animation to make room for the new information. Moreover, when removing an item from the display from a list of several items, parts of the display may be moved in an animation before fading out the item to be removed. The part of the display that is moved can correspond either to the item to be removed or the items that are not being removed As discussed above, the current hierarchy can be changed by selecting a different hierarchy from hierarchy selection area 306, whereupon the specified objects 308-1 and 1000-1 will be displayed within the different hierarchy. Additionally, using procedures discussed above, the structures representing the specified objects within a first hierarchy can be visually morphed into different structures that represent the specified objects in a different hierarchy.

Graphical user interface 300 further includes a selected object display area 1100 to display a list that includes an indication of the object specified in object entry area 302 along with one or more indications of the additional objects selected from search results area 900. The selected object display area 1100 facilitates the removal of a listed object from hierarchy display area 304 so that, upon selection of a listed object, the selected object is removed from hierarchy display area 304.

For example, hierarchy display area 304 illustrates both "John Doe" and "John F. Doe" within a management hierarchy. Selected object display area 1100 indicates that objects "John Doe" and "John F. Doe" are illustrated with respect to the current hierarchy. Upon selecting "John F. Doe" from selected object display area 1100 and upon further selecting control 1102, the information corresponding to "John F. Doe" (nodes 906) is removed from hierarchy display area 304. Moreover, the indication of "John F. Does" is removed from selected object display area 1100. In this manner, a user can remove information from hierarchy display area 304.

Figure 12:
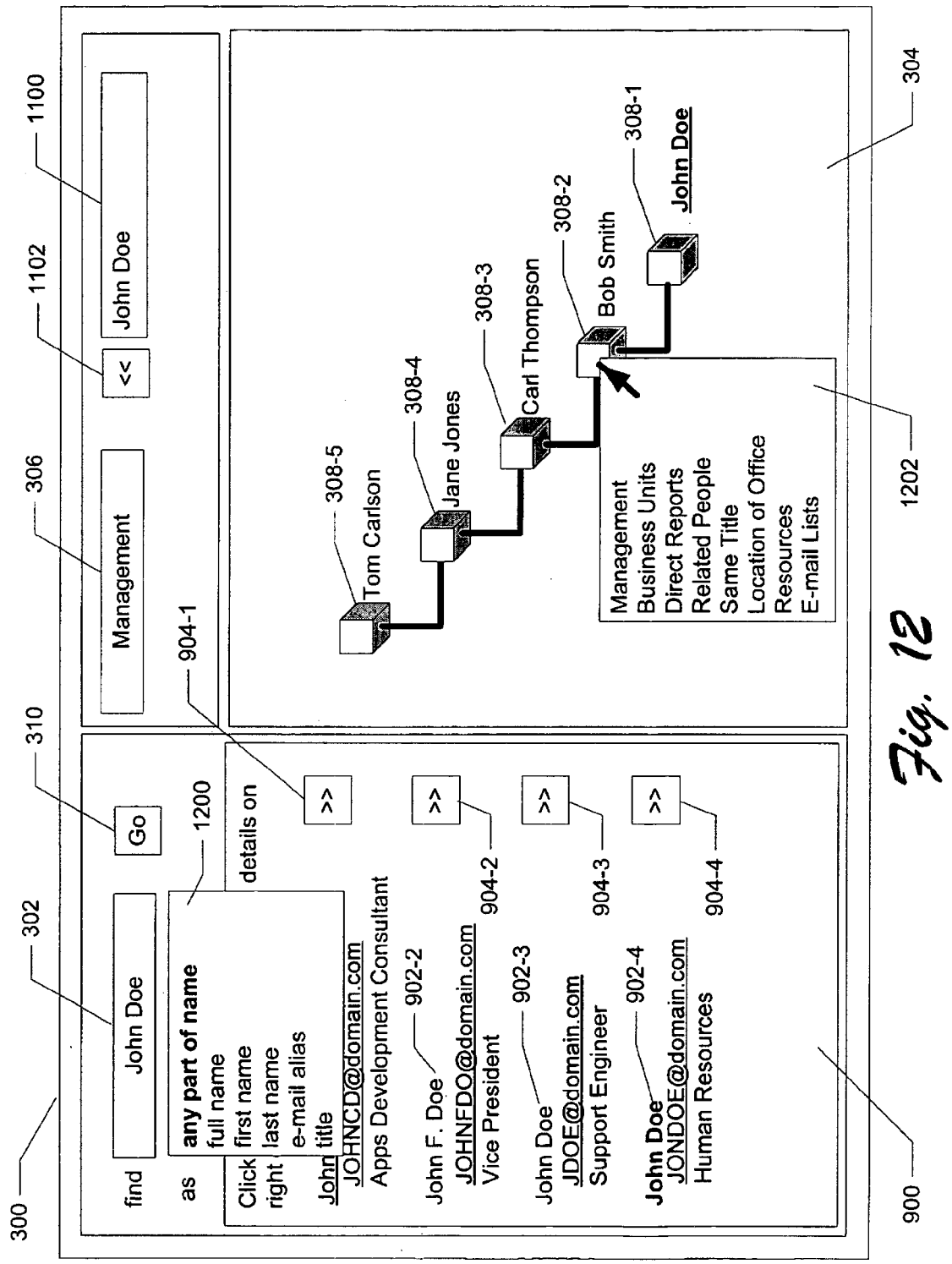
FIG. 12 illustrates the graphical user interface of FIG. 9.

FIG. 12 illustrates that only information corresponding to John Doe is shown in hierarchy display area 304 upon user selection of John F. Doe from selected object display area 1100 and control 1102.

Graphical user interface 300 further includes a filter selection area 1200 to provide a filter to further determine the object identifiers 902, or additional objects to be displayed in search results area 900. The filter(s) corresponds to the object specified in object entry area 302. In this example, because the specified object is a name, the filter "any part of the name" corresponds to a name. The object identifiers 904 are those objects that matched either "John" or "Doe". Moreover, if the filter were changed to one of "full name", "first name", "last name", "e-mail alias", "title", or the like, the additional objects would be those objects that met the criteria of the selected filter.

A node 308 displayed within a hierarchy includes context sensitive information 1202. Upon user selection of a node (e.g., with a right-mouse button click) the context sensitive information is displayed to provide indications of the hierarchies that correspond to the node. Upon user selection of one of the node's displayed hierarchies, the node is displayed with respect to the selected hierarchy.

Figure 13:
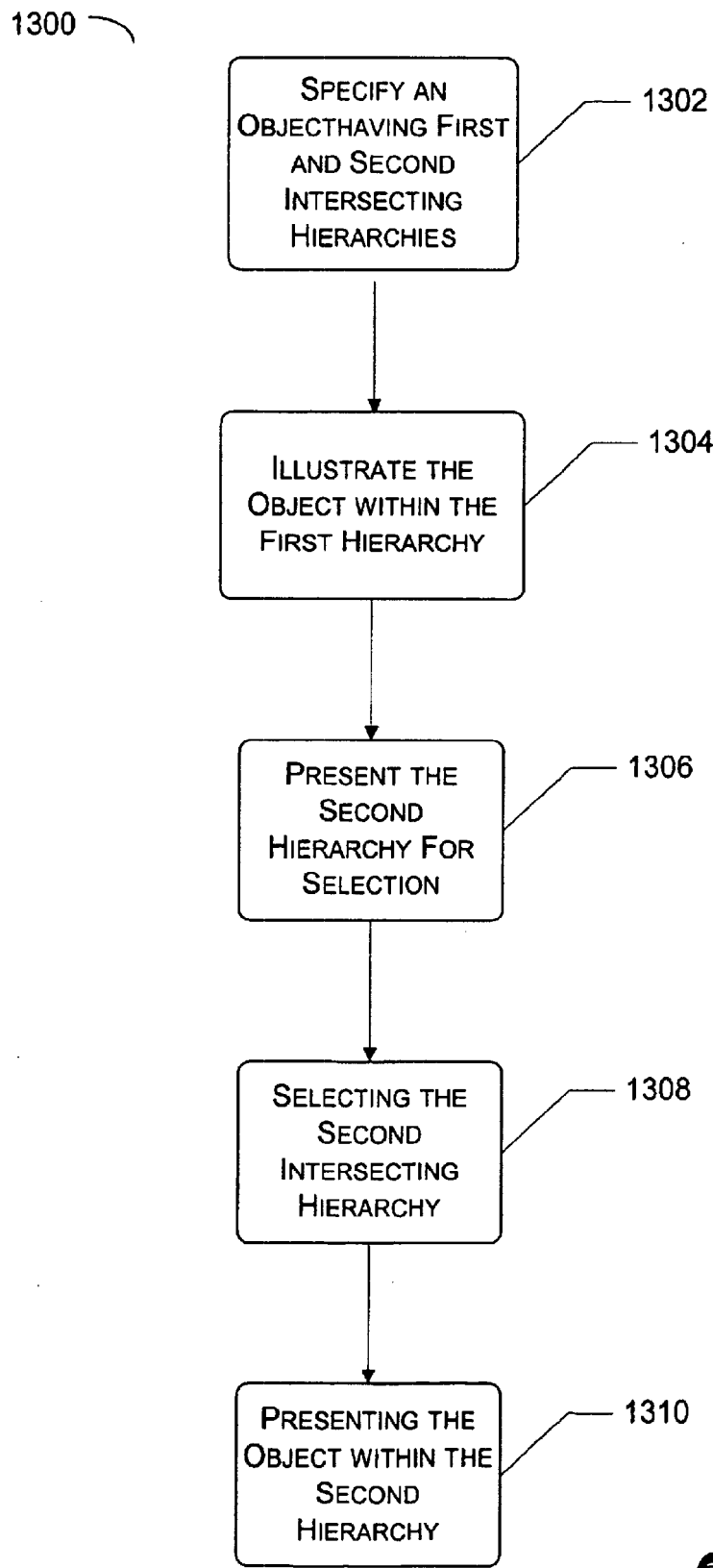
FIG. 13 is a flowchart that illustrates a procedure for displaying objects within multiple hierarchies of information.

FIG. 13 is a flowchart that illustrates a procedure 1300 for displaying objects within multiple hierarchies of information. At step 1302, the procedure specifies an object having first and second intersecting hierarchies. At step 1304, the procedure illustrates the object with respect to the first hierarchy. At step 1306, the procedure presents the second intersecting hierarchy for selection to illustrate the object with respect to the second intersecting hierarchy. At step 1308, the procedure selects the second intersecting hierarchy. At step 1310, the procedure, in response to the selecting, illustrates the object with respect to the second intersecting hierarchy. In this manner, objects are displayed within multiple intersecting hierarchies of information.

Managing Objects within Hierarchies and Polyarchies

An object that is displayed with a hierarchy can be managed by creating objects in a hierarchy, deleting an object from a hierarchy, or changing the object's relationships with respect to other objects in the hierarchy.

For example, to add an object to a hierarchy, an insert command (not shown) can be selected, whereupon a new object would de displayed in the hierarchy with a type in box for typing in an object identifier. To remove an object from a hierarchy, an object can be selected and a deleted command can be issued, whereupon the object will be removed from the hierarchy. In both of these instances, corresponding databases would be updated accordingly to reflect the change in the hierarchy.

In yet another example, referring to FIG. 3, if John Doe 308-1 is promoted to Carl Thompson's 308-3 manager, node 308-1 is selected and dragged to the location between nodes 308-3 and 308-4, whereupon node 308-1 is dropped. As a result, John Doe will be represented within the management hierarchy as both manager to Carl Thompson and Bob Smith—corresponding databases are updated to reflect the management change. Drag and drop techniques are well-known. In this manner, relationships between objects within an intersecting hierarchy can be managed.

Conclusion

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

What is claimed is:

1. A method comprising:
specifying an object having first and second intersecting hierarchies, the first and second intersecting hierarchies comprise a plurality of additional objects;
illustrating the object with respect to the first hierarchy; and
presenting a second intersecting hierarchy selection option to illustrate the object with resnect to the second intersecting hierarchy in response to user selection;
presenting context sensitive information for the object and an additional object, the context sensitive information for the additional object comprising an indication of a third hierarchy; and
  (a) if the first hierarchy intersects the third hierarchy, illustrating both the object and the additional object with respect to the third hierarchy; and
  (b) if the first hierarchy does not intersect the third hierarchy, illustrating only the additional object with respect to the third hierarchy.

2. A method as recited in claim 1 wherein the object is illustrated with respect to the first intersecting hierarchy as a three-dimensional structure.

3. A method as recited in claim 1, wherein the first and second hierarchies are determined by an administrator.

4. A method as recited in claim 1, further comprising:
responsive to specifying:
  (a) displaying additional objects that correspond to the object;
  (b) exposing one or more attributes that correspond to the object; choosing an attribute; and
responsive to selection, filtering the additional objects based on the chosen attribute.

5. A method as recited in claim 1, further comprising responsive to selection of the second intersecting hierarchy selection option illustrating the object with respect to the second intersecting hierarchy.

6. A method as recited in claim 5, wherein illustrating the object further comprises visually morphing from the first intersecting hierarchy to the second intersecting hierarchy.

7. A method as recited in claim 5, wherein illustrating the object flasher comprises:
visually morphing from the first intersecting hierarchy to the second intersecting hierarchy, one or more additional objects being illustrated with respect to the first intersecting hierarchy; and
wherein visually morphing comprises:
  simultaneously illustrating at least a portion of both the first and second intersecting hierarchies and graphically pivoting about the object to temporarily show a relationship of the objects with respect to the first and second intersecting hierarchies.

8. A method as recited in claim 5, wherein illustrating the object further comprises:
visually morphing from the first intersecting hierarchy to the second intersecting hierarchy, one or more additional objects being illustrated with respect to the first intersecting hierarchy; and
wherein visually morphing comprises:
  overlaying at least a portion of both first and second intersecting hierarchies simultaneously to temporarily illustrate a relationship of the objects with respect to the first and second intersecting hierarchies.

9. A method as recited in claim 1, wherein the object is a first object, and wherein the method further comprises:
displaying a second object that corresponds to the specified first object; and
responsive to selection of the second object, illustrating both the first and second objects with respect to the first intersecting hierarchy.

10. A method as recited in claim 9, and further comprising, responsive to selection of the selection of the second intersecting hierarchy selection option, illustrating the first and second objects with respect to the second intersecting hierarchy.

11. A method as recited in claim 9, and further comprising removing the first object such that only the second object is illustrated with respect to the first intersecting hierarchy.

12. A computer-readable medium storing computer-executable instructions that, when executed on a computer, performs the method of claim 1.

13. A method comprising:
presenting an object with respect to a first hierarchy of information;
switching from the first hierarchy of information to a second hierarchy of information using a visual pivot technique in which the second hierarchy of information is visually pivoted about a pivot axis intersecting the object and the object is presented with respect to the second hierarchy of information; and
wherein the first and second hierarchies intersect at the object, the first hierarchy associated a first data relationship of the object the second hierarchy associated with a second data relationship of the object, the first data relationship being different than the second data relationship.

14. A graphical user interface comprising:
a first area to facilitate user specification of an object that may be represented in first and second hierarchies;
a second area to illustrate the object with respect to the first hierarchy; and
a third area to facilitate user selection of the second hierarchy so that, upon selection of the second hierarchy, the second area is changed to illustrate the object with respect to the second hierarchy, the object being displayed in the second area in context of a current hierarchy, the current hierarchy being selected from a group of hierarchies consisting of the first and second hierarchies;
a fourth area to display the specified object and additional objects that correspond to the specified object, the fourth area facilitating user selection of an additional object so that, upon selection of the additional object, the second area is changed to illustrate the object and the additional object within the current hierarchy; and
a fifth area to display attributes of the specified object, the fourth area facilitating filtering of the additional objects displayed in the fourth area.

15. A graphical user interface as recited in claim 14, wherein the graphical user interface changes the second area to illustrate the object with respect to the second intersecting hierarchy by visually morphing from the first hierarchy to the second hierarchy.

16. A graphical user interface as recited in claim 14, wherein the graphical user interface changes the second area to illustrate the object with respect to the second intersecting hierarchy by:
  (a) rotating the second hierarchy about a pivot axis onto the first hierarchy; and
  (b) fading out the first hierarchy to leave only the second hierarchy.

17. A system comprising:

a computer coupled to a data store comprising a plurality of databases, the computer comprising a processor coupled to a memory, the memory comprising computer-executable instructions for:

specifying an object from the data store;

in response to specifying, receiving data from the data store, the data comprising first and second hierarchies of information that correspond to the specified object, the first and second hierarchies of information intersecting at the object, the first hierarchy being associated a first data relationship of the object, the second hierarchy being associated with a second data relationship of the object, the first data relationship being different than the second data relationship;

visually morphing from the first intersecting hierarchy to the second intersecting hierarchy to illustrate the object and one or more additional objects within the first hierarchy, visually morphing comprising:

(a) simultaneously illustrating at least a portion of both the first and second intersecting hierarchies; and (b) graphically pivoting about the object to temporarily show a relationship of the objects with respect to the first and second intersecting hierarchies;

presenting an indication of the second hierarchy for user selection to illustrate the object with respect to the second hierarchy.

18. A system as recited in claim 17, wherein the processor is further configured to execute computer program instructions for managing the object with respect to the first and second hierarchies.

* * * * *